United States Patent Office

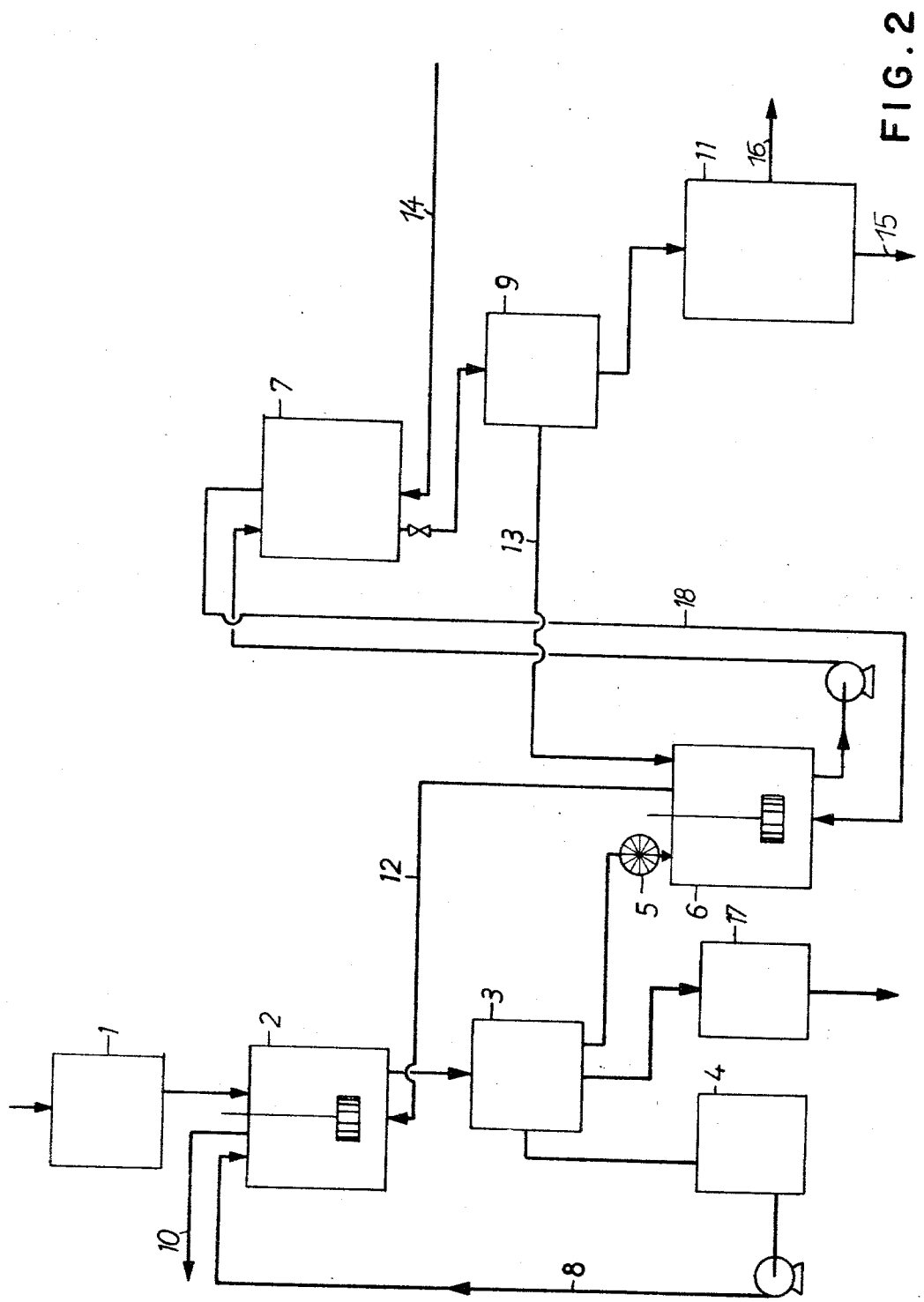

3,751,560
Patented Aug. 7, 1973

3,751,560
MULTI-STAGE PROCESS FOR THE PREPARATION OF SODIUM BICARBONATE
Ulrich Neumann, Rodenkirchen, Germany, assignor to Chemiebau, Dr. A. Zieren GmbH. & Co. KG, Cologne-Mungersdorf, Germany
Filed Apr. 7, 1971, Ser. No. 131,987
Claims priority, application Germany, Apr. 8, 1970, P 20 16 633.0; Oct. 2, 1970, P 20 48 486.0
Int. Cl. C01d 7/10
U.S. Cl. 423—189
13 Claims

ABSTRACT OF THE DISCLOSURE

Sodium bicarbonate is produced from an aqueous solution of sodium hydroxide obtained from the sodium amalgam electrolytic process by:

(a) Reacting the sodium hydroxide solution with carbon dioxide at about 70–110° C., preferably 95–105° C., in a first stage to form a crystalline precipitate containing sodium carbonate monohydrate while simultaneously evaporating water from the reaction mixture;

(b) Separating the crystalline precipitate from mother liquor thereof and recycling the latter to the first stage;

(c) In a second stage, dissolving the separated crystalline precipitate containing sodium carbonate monohydrate, and reacting the resultant solution with carbon dioxide at 20–70° C., preferably 30–40° C., to precipitate sodium bicarbonate;

(d) Separating the resultant solid sodium bicarbonate from mother liquor, and recycling the latter into the second stage to dissolve said crystalline precipitate.

BACKGROUND OF THE INVENTION

This invention relates to, in general, a process for the preparation of sodium bicarbonate from a sodium hydroxide solution by reaction with carbon dioxide at an elevated temperature, and in particular to a process wherein the sodium hydroxide is obtained electrolytically from the sodium amalgam process.

When it is attempted to convert a concentrated sodium hydroxide solution, as obtained from the alkaline chlorine electrolysis according to the amalgam process, to sodium bicarbonate by the introduction of carbon dioxide, there is formed a thick aqueous crystalline sludge containing sodium bicarbonate, sodium carbonate, and mixed crystals of both carbonates. This crystalline mixture absorbs carbon dioxide so slowly that a quantitative conversion to sodium bicarbonate is impossible, for all practical purposes. Furthermore, the separation of the crystalline mass from its mother liquor, while technically feasible, is quite troublesome.

From Swiss Pat. 253,010, a process is disclosed wherein a solution of sodium hydroxide containing 80–150 g./l. of NaOH is reacted with carbon dioxide to sodium bicarbonate; the mother liquor separated from the thus-formed sodium bicarbonate is recycled into the sodium amalgam decomposition stage. The sodium bicarbonate contained in the mother liquor is there reacted, with freshly formed sodium hydroxide solution, to soda (sodium carbonate), so that a soda-containing sodium hydroxide solution is discharged from the electrolytic cells. This process exhibits the disadvantage that it is dependent on an alkaline chlorine electrolysis system.

From German OS [unexamined published application] 1,567,922, a process is disclosed wherein the mother liquor of the sodium bicarbonate precipitating step is recycled into the precipitation stage, rather than into the amalgam decomposition stage. This procedure eliminates the disadvantageous linkage of the process to the electrolysis; however, because a portion of the mother liquor cannot be recycled, this process involves a loss in sodium bircarbonate of about 5%. This loss can be compensated for only where the unrecycled solution can be utilized in another process, for example in the ammonia-soda [Solvay] process, which is possible only in rare cases.

SUMMARY OF THE INVENTION

A principal object of the present invention is to provide a process for a practically 100% conversion of sodium hydroxide solution to sodium bicarbonate.

Another object is to use in this process the sodium hydroxide solution resulting from the sodium amalgam process.

Another object is to provide a thermally efficient process, i.e. using a relatively small quantity of external heat.

Still another object is to provide a process obviating suspensions which are relatively difficult to separate.

Upon further study of the specification and appended claims, other objects and advantages of the present invention will become apparent.

To attain these objects, there is provided a process comprising:

(A) Reacting, in a first stage, the sodium hydroxide solution with carbon dioxide to form a crystalline precipitate containing sodium carbonate monohydrate and simultaneously evaporating water from the reaction mixture during this step, (B) Separating the crystalline precipitate from the mother liquor and recycling the latter into the first stage;

(C) In a second stage, dissolving the crystalline precipitate containing sodium carbonate monohydrate and reacting same with carbon dioxide to sodium bicarbonate, and, (D) Separating the solid sodium bicarbonate from the mother liquor, and recycling the latter as a solvent into the second stage.

DETAILED DISCUSSION OF THE INVENTION

In the first stage of the process of this invention, the water introduced with the sodium hydroxide solution is evaporated except for the moistness adhering to the product. The heat energy required for the evaporation is supplied predominantly by the heat of neutralization and, if necessary, heat supplied by an external source. Inasmuch as, essentially, a moist solid mass is recovered, the withdrawal of a substantial quantity of a saturated sodium bicarbonate solution from the process is circumvented, which otherwise would necessarily result in losses of sodium bicarbonate or an additional consumption of heat energy for the evaporation of the solution. In the present process, the yield in solid sodium bicarbonate is almost 100%, with a minimum requirement of external heat. The external heat to be supplied in the first stage decreases with an increasing concentration of the sodium hydroxide solution to be processed and approaches zero with a 50–55% by weight soluiton of NaOH.

The crystalline precipitate containing sodium carbonate monohydrate, formed in the first stage, can comprise essentially only sodium carbonate monohydrate, that is, if the supply of NaOH is sufficiently ample. However, it is also possible for trona to be formed in the first stage, i.e. $Na_2CO_3 \cdot H_2O \cdot NaHCO_3 \cdot H_2O$, if the quantitative ratio of the reactants $NaOH/CO_2$ in the reactor is lower than required for the formation of sodium carbonate monohydrate. In any case, it is preferred that only sodium carbonate monohydrate be obtained in the first stage.

The crystalline precipitate produced in the first stage is dissolved in recycled mother liquor of the second stage and then further reacted, in the second stage, to sodium bicarbonate with $CO_2$ under cooling. The temperature is to be kept low in this second stage in order to obtain as quantitative a precipitation of the sodium bicarbonate as possible.

Preferably, the reaction in the first stage takes place at a minimum temperature of 70°, preferably 95° C., and a maximum temperature of 110° C., preferably 105° C. Within these ranges, it is possible to extensively vaporize the water introduced into the first stage by the sodium hydroxide solution. In general, more than 60%, preferably 80–95% of the water introduced with the sodium hydroxide solution is vaporized in the first stage. The temperature in the first stage depends largely on the $CO_2$ concentration in the carbonation gas; the lower the $CO_2$ concentration in the gas, the lower the temperature.

In the second stage, the reaction is suitably effected at a minimum temperature above the freezing point of the solution, preferably 20° and more preferably 30° C., and at a maximum temperature of 70° C., preferably 40° C. The heat liberated during the reaction of the dissolved crystalline precipitate with carbon dioxide is removed from the reaction medium of the second stage, by indirect and/or evaporative cooling.

It is preferred that the conversion of sodium carbonate monohydrate to sodium bicarbonate be conducted in an agitated tank arranged in cascade, with the reaction mixture flowing countercurrently to the $CO_2$, and the temperature in the direction of flow of the reaction mixture being lowered from one vessel to the next. In this manner, there is achieved a complete conversion of the crystalline precipitate from the first stage, e.g. the sodium carbonate monohydrate, into sodium bicarbonate. The higher temperature at the beginning of the cascade makes it possible to dissolve crystalline precipitate from the first stage quite rapidly; conversely, the lower temperature at the end of the cascade results in an efficient precipitation and separation of the sodium bicarbonate.

To reduce the amount of external heat required in the first stage, the sodium hydroxide solution can be preheated by heat exchange contact with the vapors leaving the first stage. Alternatively it is also possible to utilize these same vapors from the first stage to dry the moist sodium bicarbonate obtained at the outlet of the second stage after separation from the mother liquor therefrom. In the latter case, the drying temperature ranges approximately between 50 and 75° C.

The conversion of the sodium hydroxide solution to a crystalline precipitate containing sodium carbonate monohydrate in the first stage is preferably conducted in at least one agitated reactor. Suitably, some of the agitated tanks are equipped with hollow agitators through which the $CO_2$ can be delivered. In this manner, diffusional resistances to mass transfer are diminished, thereby accelerating the transfer in the first and/or second stages resulting in an overall improvement in the rates of reaction.

In certain cases, it may be advantageous to react the sodium hydroxide solution obtained from the alkaline chlorine electrolysis only partially to sodium bicarbonate and to process the remainder to soda ash [anhydrous $Na_2CO_3$]. In such a case, it would appear to be inordinately expensive from the viewpoint of initial capital outlay to produce sodium bicarbonate in a plant according to the method of this invention and then to further process a portion of this sodium bicarbonate to soda ash, or, alternatively, to react part of the sodium hydroxide solution to soda ash in a separate plant in accordance with the process of DAS [German published application] 1,567,921. However, there are substantial offsetting advantages to be gained.

It has now been found that it is possible, according to the present invention, to convert the sodium hydroxide solution to soda ash and sodium bicarbonate in any desired quantitative ratio by converting only a portion of the sodium carbonate monohydrate-containing crystalline precipitate formed in the first stage to sodium bicarbonate in the second stage, and calcining the other portion of the crystalline precipitate containing the sodium carbonate monohydrate in a conventional manner at 130–190° C. to sodium carbonate of a high density. The proportions of the crystalline precipitate converted to sodium bicarbonate or calcined to anhydrous sodium carbonate can be varied at will, e.g., 0.1:1 to 1:1, respectively. Thereby, the production of sodium bicarbonate can be adapted to fluctuations in product sales and yet the first stage of the plant can be fully utilized. The sodium carbonate obtained in this process has a bulk density of preferably 0.85–1.15 g./cm.$^3$. Finally, as stated previously, the crystalline precipitate containing the sodium carbonate monohydrate is preferably straight sodium carbonate monohydrate, but it is also possible to crystallize trona in the first process stage.

BRIEF DESCRIPTION OF THE DRAWINGS

FIG. 2 is a schematic illustration of a preferred embodiment of the invention, directed to the production of both sodium bicarbonate and soda ash.

DETAILED DESCRIPTION OF PREFERRED EMBODIMENTS

Figure 1:
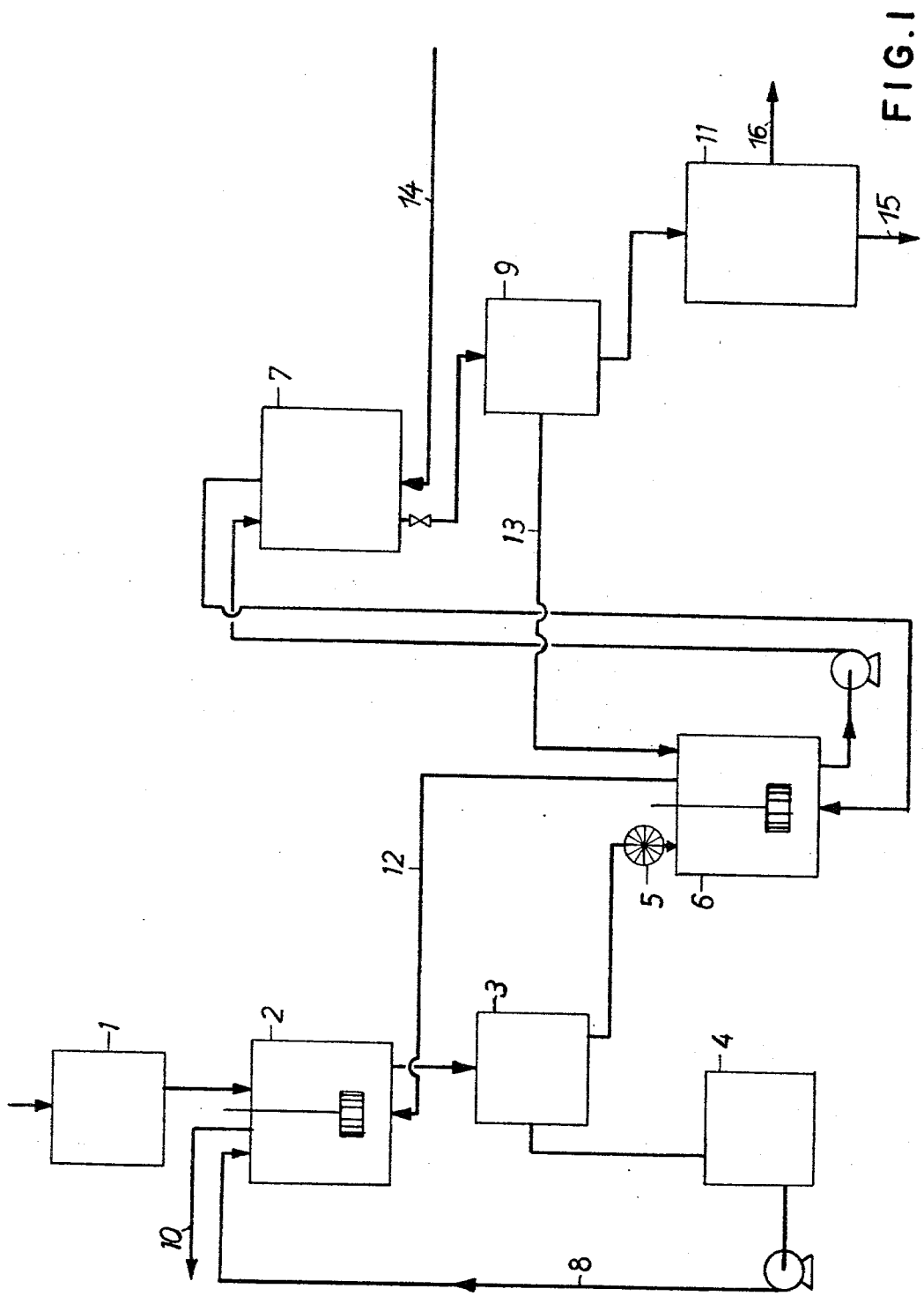
FIG. 1 is a schematic illustration of a preferred embodiment of the process of this invention, directed solely to the production of sodium bicarbonate.

The sodium hydroxide solution, in the embodiment of FIG. 1, passes, at a temperature of 65° C., from holdup tank 1 into an agitated tank 2 equipped with a gas-distributing agitator. The $CO_2$-containing gas derived from the second stage via conduit 12, is introduced into the agitated tank 2, and a reacted practically quantitatively, with the sodium hydroxide solution therein to sodium carbonate monohydrate. The temperature of the agitated tank 2 is maintained at about 100° C. The waste gas leaving the tank 2 through conduit 10 contains more than 90% of steam; the remainder is $CO_2$ and inert gas. The reaction mixture withdrawn from agitated tank 2 is separated in centrifuge 3, forming a moist crystalline precipitate and a mother liquor. The mother liquor is collected in a pump feed tank 4 and recycled from there by pumping via conduit 8 into the agitated tank 2.

The thus-crystallized sodium carbonate monohydrate from centrifuge 3 is introduced into an agitated tank 6 by way of a solids feed distributor 5 such as a star feeder or the like. Simultaneously, via conduit 13, a saturated sodium bicarbonate solution is fed to tank 6. A still further tank 7 is connected downstream of the agitated tank 6, into which container the reaction mixture flows after leaving the tank 6. The carbon dioxide-containing gas flows in the opposite direction through the tanks 7 and 6, and during this step, yields a portion of its carbon dioxide to the solution which portion is consumed by the reaction of the dissolved soda to form sodium bicarbonate.

The reaction mixture from tank 7 is introduced into a centrifuge 9 and separated therein into a mother liquor, consisting of a saturated sodium bicarbonate solution, and solids containing only about 5–10% by weight of water at this point. The mother liquor from the centrifuge 9 is recycled continuously through conduit 13, into the agitated tank 6 of the second stage. The moist sodium bicarbonate from the centrifuge 9 is then dried in a dryer 11 at about 60° C.

In the embodiment depicted in FIG. 2, a portion of the thus-crystallized sodium carbonate monohydrate from centrifuge 3 is calcined in a calcining drum 17 to soda ash. The other portion of the monohydrate is further processed to sodium bicarbonate, as in the process described in FIG. 1.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In a two-stage demonstration plant corresponding to FIG. 1, 1190 kg./h. of 50% solution of sodium hydroxide is fed to the agitated tank 2 at an inlet temperature of 85° C. The sodium hydroxide solution is reacted at 100° C. with 276 Nm.$^3$/h. of $CO_2$-containing gas having 65 kg./h. of $H_2O$ (fed via conduit 12), to form sodium carbonate monohydrate. From the agitated tank 2, 650 Nm.$^3$/h. of spent gas escapes containing 448 kg./h. of steam.

From the agitated tank 2, a crystalline sludge is withdrawn at a temperature of 100° C., and after separation in the centrifuge 3, there is recovered 1086 kg./h. of moist sodium carbonate monohydrate, containing 830 kg. of solid matter. The mother liquor is pumped back into the agitated tank 2. The moist sodium carbonate monohydrate, in the second stage comprising tanks 6 and 7, is dissolved in an approximately 10% strength sodium bicarbonate solution preheated to about 50° C. The solution is then converted to sodium bicarbonate with gaseous $CO_2$ fed via conduit 14. In the tanks 6 and 7, a temperature is employed which drops from about 65° C. to 30° C., with about 373 Nm.$^3$/h. of gaseous $CO_2$ being fed into the container 7 at a temperature of about 20° C. The crystalline sludge from the container 7 is separated in the centrifuge 9 into 1364 kg./h. of moist sodium bicarbonate and a residual saturated solution of sodium bicarbonate. The moist sodium bicarbonate is then dried in the dryer 11, with 1250 kg./h. of sodium bicarbonate, corresponding to a yield of 100%, being withdrawn through conduit 15. Also from the dryer, there is discharged via conduit 16 about 114 kg./h. of steam.

EXAMPLE 2

In a two-stage demonstration plant corresponding to FIG. 2, 1150 kg./h. of 50% strength sodium hydroxide solution is fed, at an inlet temperature of 85° C., to the agitated tank 2. The sodium hydroxide solution reacted at 100° C. with approximately 235 Nm.$^3$/h. of carbon dioxide-containing gas fed via conduit 2 to form sodium carbonate monohydrate. From the agitated tank 2, 625 Nm.$^3$/h. of waste gas is discharged via conduit 10, which waste gas entrains 470 kg./h. of steam.

The crystalline sludge withdrawn from the agitated tank 2 at a temperature of about 100° C. is separated in the centrifuge 3, into mother liquor and 1025 kg./h. of moist sodium carbonate monohydrate containing 810 kg./h. of solid matter. The mother liquor is then pumped back into the agitated tank 2.

About 455 kg./h. of moist sodium carbonate monohydrate is calcined at 160° C., wherein 339 kg./h. of soda is obtained having a specific gravity of 1.1.

The other portion of the moist monohydrate in the second stage comprising tanks 6 and 7 is dissolved in an approximately 10% strength sodium bicarbonate solution of a temperature of about 55° C., and reacted with carbon dioxide-containing gas fed via conduit 18 to form sodium bicarbonate. In tanks 6 and 7, it is possible to operate at a temperature of about 50–65° C. and 25–40° C., respectively. Via conduit 14, there is passed 290 Nm.$^3$/h. of dry $CO_2$ gas into the tank 7 at a temperature of about 30° C. The crystalline sludge from the container 7 is separated in the centrifuge 9 into 715 kg./h. of moist sodium bicarbonate and a residual saturated solution of sodium bicarbonate. The moist sodium bicarbonate is thereafter dried in the dryer 11 with 670 kg./h. of dry sodium bicarbonate being withdrawn via conduit 15 and 45 kg./h. of steam being discharged through the waste steam line 16.

COMPARATIVE EXAMPLE

The same amounts of material are employed as in Example 1; however, the reaction of the sodium hydroxide solution and $CO_2$ to sodium bicarbonate is conducted in one stage under cooling at 65–70° C. without any considerable water evaporation, and with recycling of the separated mother liquor.

The thus-formed crystals were separated from the mother liquor by centrifuging, thereby obtaining 1416 kg./h. of moist sodium bicarbonate having an adhering moisture content of 9% by weight, and an excess, i.e. aside from that mother liquor recycled, of 522 kg./h. of mother liquor in the form a 10% strength sodium bicarbonate solution. After drying the moist bicarbonate, there remains 1198 kg./h. of $NaHCO_3$, corresponding to a yield of about 95.6%.

Generally speaking, the process of this invention will work satisfactorily with any aqueous sodium hydroxide solution having a concentration of, by weight 30 to 60%, preferably 45 to 55% NaOH. Furthermore, it is preferred that in the first stage, the resultant crystalline precipitate should contain sodium carbonate monohydrate or trona or any mixtures of these two components.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of sodium bicarbonate from an aqeuous solution of sodium hydroxide, comprising the steps of:
   (a) reacting said sodium hydroxide solution with carbon dioxide in a first stage to form a crystalline precipitate containing sodium carbonate monohydrate while simultaneously evaporating more than 60% of the water introduced with the sodium hydroxide solution from the reaction mixture;
   (b) separating the crystalline precipitate from the mother liquor and recycling the latter to the first stage;
   (c) in a second stage, dissolving the separated crystalline precipitate containing sodium carbonate monohydrate in recycled mother liquor of the second stage;
   (d) reacting the resultant solution with carbon dioxide and cooling to remove liberated heat from the reaction medium and precipitate sodium bicarbonate; and
   (e) separating the resultant solid sodium bicarbonate from mother liquor, and recycling the latter into the second stage to dissolve said crystalline precipitate.

2. A process according to claim 1, wherein the reaction is conducted in the first stage at 70–110° C.

3. A process according to claim 1, wherein the reaction is conducted in the first stage at 95–105° C.

4. A process according to claim 1, wherein the reaction is conducted in the second stage at 20–70° C.

5. A process according to claim 1, wherein the reaction is conducted in the second stage at 30–40° C.

6. A process according to claim 1, wherein the crystalline precipitate containing sodium carbonate monohydrate is converted to sodium bicarbonate in a cascade reaction zone, the $CO_2$ being passed countercurrently to the reaction mixture and wherein the temperature is lowered from container to container in the direction of flow of the reaction mixture.

7. A process according to claim 1, further comprising preheating the sodium hydroxide solution with vapors exhausting from the first stage.

8. A process according to claim 1, wherein the reaction of the sodium hydroxide solution with $CO_2$ to form the crystalline precipitate containing sodium carbonate monohydrate is conducted in an agitated tank.

9. A process according to claim 1, further comprising drying resultant separated solid sodium bicarbonate with vapors exhausting from the first stage.

10. A process according to claim 1, wherein the sodium hydroxide solution in the first stage is reacted to form only sodium carbonate monohydrate.

11. A process according to claim 1, characterized in that the sodium hydroxide solution is reacted in the first stage to form, in part, trona, $$Na_2CO_3 \cdot H_2O \cdot NaHCO_3 \cdot H_2O.$$

12. A process according to claim 1, further comprising preheating the mother liquor of the second stage with vapors exhausting from the first stage, before said mother liquor is recycled into the second stage.

13. A process according to claim 1, wherein only a portion of the crystalline precipitate containing sodium carbonate monohydrate formed in the first stage is reacted in the second stage to form sodium bicarbonate, and further comprising calcining the other portion of the crystalline precipitate at 130–190° C. to form high density sodium carbonate.

References Cited

UNITED STATES PATENTS

| | | | |
|---|---|---|---|
| 1,865,833 | 7/1932 | Chesny | 23—64 |
| 2,383,674 | 8/1945 | Osborne | 23—64 X |
| 2,926,995 | 3/1960 | Mod et al. | 23—64 |
| 3,531,240 | 9/1970 | Furkert | 23—64 X |

FOREIGN PATENTS

| | | | |
|---|---|---|---|
| 1,171,732 | 11/1969 | England | 23—64 |

OSCAR R. VERTIZ, Primary Examiner

J. COOPER, Assistant Examiner

U.S. Cl. X.R.

423—421, 422, 425, 427